United States Patent
Imura et al.

(10) Patent No.: US 7,875,836 B2
(45) Date of Patent: Jan. 25, 2011

(54) TAG ASSEMBLY FOR RADIO FREQUENCY IDENTIFICATION CONTROLLED HEATABLE OBJECTS

(76) Inventors: Mamoru Imura, 11100 W. 58th St., Shawnee, KS (US) 66203; Michael F. Johnson, 11100 W. 58th St., Shawnee, MO (US) 66203

( * ) Notice: Subject to any disclaimer, the term of this patent is extended or adjusted under 35 U.S.C. 154(b) by 0 days.

(21) Appl. No.: 11/148,802

(22) Filed: Jun. 9, 2005

(65) Prior Publication Data

US 2005/0285735 A1     Dec. 29, 2005

Related U.S. Application Data

(63) Continuation-in-part of application No. 10/833,356, filed on Apr. 28, 2004, now Pat. No. 7,157,675.

(51) Int. Cl.
*H05B 6/12*     (2006.01)

(52) U.S. Cl. .................................... 219/627; 219/620

(58) Field of Classification Search .............. 219/627, 219/619, 620, 621, 622, 623, 624, 625, 626
See application file for complete search history.

(56) References Cited

U.S. PATENT DOCUMENTS

| | | | |
|---|---|---|---|
| 3,742,178 A | 6/1973 | Harnden, Jr. | |
| 3,742,179 A | 6/1973 | Harnden, Jr. | |
| 4,386,900 A | 6/1983 | Sultan | |
| 4,917,852 A | 4/1990 | Poole et al. | |
| 5,441,344 A | 8/1995 | Cook, III | |
| 5,951,900 A | 9/1999 | Smrke | |
| 5,954,984 A | 9/1999 | Ablah et al. | |
| 6,206,564 B1 | 3/2001 | Adamczewski | |
| 6,232,585 B1 | 5/2001 | Clothier et al. | |
| 6,271,497 B1 | 8/2001 | Zapletal | |
| 6,274,856 B1 | 8/2001 | Clothier et al. | |
| 6,316,753 B2 | 11/2001 | Clothier et al. | |
| 6,320,169 B1 | 11/2001 | Clothier | |
| 6,444,961 B2 * | 9/2002 | Clothier et al. | 219/622 |
| 6,504,135 B2 | 1/2003 | Clothier et al. | |
| 6,512,211 B1 | 1/2003 | Lockhart et al. | |
| 6,563,087 B1 | 5/2003 | Yokoyama et al. | |
| 6,589,111 B1 | 7/2003 | Giroux | |
| 6,657,170 B2 | 12/2003 | Clothier | |
| 6,664,520 B2 | 12/2003 | Clothier | |
| 6,822,204 B2 | 11/2004 | Clothier | |
| 6,953,919 B2 * | 10/2005 | Clothier | 219/620 |
| 2004/0016348 A1 | 1/2004 | Sharpe | |
| 2004/0149736 A1 | 8/2004 | Clothier | |
| 2004/0173601 A1 | 9/2004 | Lutz | |

OTHER PUBLICATIONS

First Amended Complaint in Case No. 08-CV-2220-JWL-DJW, *Thermal Solutions, Inc. v. Imura International U. S.A. Inc.*, Vita Craft Corporation, and Mamoru Imura.

* cited by examiner

*Primary Examiner*—Daniel Robinson
(74) *Attorney, Agent, or Firm*—Kutak Rock LLP

(57) ABSTRACT

Components for use in a temperature controlled heatable object are provided in which a temperature sensor is connected to a transmitter such as a Radio Frequency Identification (RFID) tag. The RFID tag is encased in a protective overmolding and connected to the temperature sensor via a mineral insulated cable. An end cap containing a potting material (such as silicone or ceramic) is placed over the temperature sensor and laser welded to a sheathing of the mineral insulated cable. A potting material for use in a heatable object is also provided comprising a silicone-based material that is modified by adding bauxite to increase thermal conductivity.

20 Claims, 2 Drawing Sheets

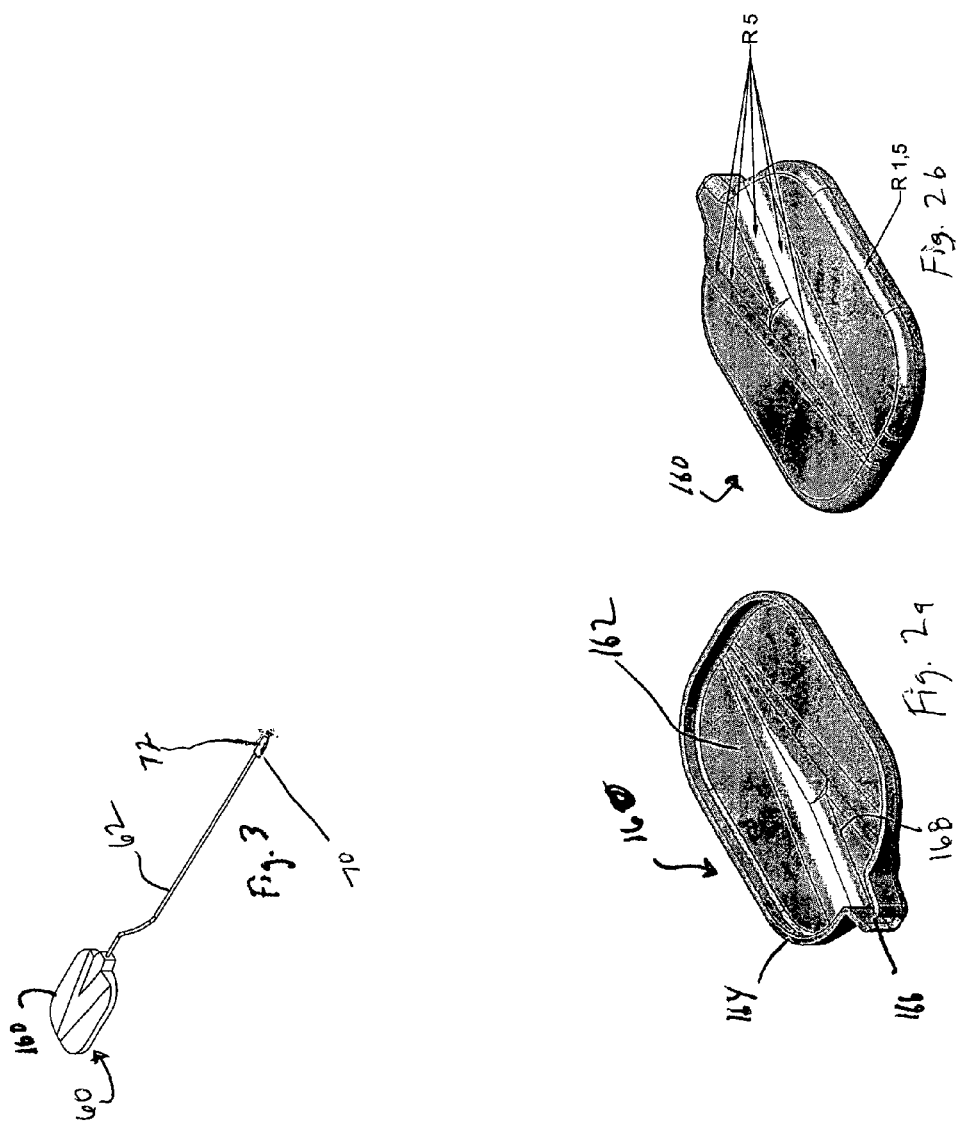

TAG ASSEMBLY FOR RADIO FREQUENCY IDENTIFICATION CONTROLLED HEATABLE OBJECTS

CROSS-REFERENCE TO RELATED APPLICATIONS

This is a continuation-in-part of U.S. application Ser. No. 10/833,356 filed Apr. 28, 2004 now U.S. Pat. No. 7,157,675, the disclosure of which is incorporated herein by reference in its entirety.

FIELD OF THE INVENTION

The present invention is broadly concerned with temperature regulated items such as cookware and servingware items, including (but not limited to) pots, pans, buffet serving pans, serving dishes, platters, and the like. More particularly, the invention is concerned with a tag assembly for objects that are temperature regulated using Radio Frequency Identification (RFID) technology and temperature sensors associated with the objects. An RFID tag, which is associated with a temperature sensor, includes information regarding heating characteristics of the particular object. The RFID tag transmits the information regarding the heating characteristics of the object as well as temperature reading information to a reader located within a cookware appliance, which are used by the cookware appliance to regulate the temperature of the cooking process.

BACKGROUND OF THE INVENTION

Cooking is often referred to as an art, not only because of the combination of ingredients that go into a particular recipe, but also due to the skill necessary for proper application and infusion of varying levels of heat over a given period of time throughout the different phases of the food preparation process. Traditional cookware appliances, such as ovens (microwave ovens being an exception), grills, heat lamps and stoves, all utilize the thermodynamic process of conduction to transfer heat from the outer surface of the food item to its interior. This is generally true regardless of the type of heat source used to heat the surface of the food, be it a radiation heat source (i.e. a heat lamp), conduction heat source (i.e. a stovetop), or a convection heat source (i.e. a convection oven or a food dehydrator).

The time and temperature necessary to cook fully and properly a specific food item through conduction is dependant upon the thermal conductivity of the item, the uncooked temperature of the item (i.e. frozen, room temperature, etc.), as well as the size and shape of the item. A food item having higher thermal conductivity will cook faster than a similarly sized and shaped food item having a lower thermal conductivity, as the heat will more quickly migrate from the outer surface to the interior. Likewise, a generally smaller or thinner food item will cook faster than a generally larger or thicker food item of the same thermal conductivity, as the heat must migrate a shorter distance through the thinner item. Frozen items require considerably more heat to cook than do non-frozen or thawed items. While increasing the cooking temperature for an item will increase the amount of heat that migrates from the surface to the interior of a food item, applying too much heat at one time will result in cooking the outer surface of the item faster than the heat can migrate to the interior, usually resulting in burning or scorching of the surface and undercooking of the interior. Therefore, obtaining real-time information regarding the temperature of the item being cooked (or at least the temperature of the pot or pan at a location as close as possible to the item being cooked), during the cooking process is often beneficial to ensure proper heating.

U.S. Pat. application Ser. No. 10/833,356, filed Apr. 28, 2004 by Imura, the disclosure of which is incorporated herein by reference in its entirety, discloses temperature controlled heatable objects, such as cookware and servingware, that each include a temperature sensor in contact with the heatable portion of the object and a Radio Frequency Identification (RFID) tag connected to the temperature sensor by a pair of wires. The RFID tag, which is located away from the heatable portion of the object (usually in a handle), acts as a transmitter (and sometimes as a receiver) to communicate with a reader/writer located in a cook-top for heating the object, providing temperature information and other information regarding the object (such as heating characteristics) to the cook-top. The temperature information and the heating information are used by the cook-top to control the temperature of the object. The heatable objects disclosed in by Imura are particularly well suited for use with the induction heating systems and methods described in U.S. Pat. No. 6,320,169 to Clothier, and in U.S. Pat. application Ser. No. 10/355,989 to Clothier, the disclosures of which are incorporated herein by reference in their entirety, and overcome a number of problems inherent in heatable objects of the prior art. Notwithstanding, heatable objects such as those described in Imura, and in particular cookware objects, are subjected to extremely harsh operating conditions in which robust design is necessary to ensure proper functionality. Components of the heatable objects of Imura, such as the RFID tag, temperature sensor, and wires connecting the RFID tag to the temperature sensor are fairly delicate and susceptible to malfunction.

Imura addresses the delicate nature of these components by placing the RFID tag away from the heatable portion of the object (i.e. in the handle of a pot or pan). Imura houses the RFID tag in a special handle for the heatable object that supports the RFID tag and which is designed to provide a moisture barrier and allow moisture to drain away from the RFID tag. Imura provides shielding for the wires by locating the wires in a channel of a metal receiver that connects a handle to the heatable object. In addition, Imura provides shielding for the temperature sensor by at least partially imbedding the senor in the heatable portion of the object and surrounding the sensor with a potting material, and in some cases by covering any exposed portion of the sensor with a portion of the receiver. Notwithstanding Imura's substantial efforts to protect these sensitive components, these components are still susceptible to diminished functionality caused by the harsh operating environment in which the heatable objects are used. In particular, despite Imura's design considerations, the components are still highly susceptible to diminished functionality due to exposure to moisture. For example, prior art conductor wires are manufactured of a fiberglass (typically a fiberglass insulated nickel metal copper wire) material, which tends to absorb moisture and cause distorted information. Therefore it would be beneficial to further protect these sensitive components from moisture.

SUMMARY OF THE INVENTION

An object of the instant invention is to provide improved components of a temperature regulated object (or item). Another object of the instant invention is to provide components of a temperature regulated object that are capable of improved operation/functionality in a substantially harsh environment (such as during cooking usage and/or cleaning of the object).

The above described objects are achieved through the use of an RFID tag assembly for a heatable object that includes an RFID tag, a tag overmolding, a temperature sensor, and conductor wires connecting the RFID tag to the temperature sensor. The tag overmolding of the preferred embodiment is a shell that surrounds the RFID tag and which is filled with an epoxy-based material to waterproof and generally protect the RFID tag. The shell also functions as a stiffener for the conductor wires that are connected to terminal pads on the RFID tag. The conductor wires of the instant invention include two conductor wires (such as nickel metal copper, or other similar conducting material) that are embedded within a mineral insulation of a mineral insulated cable. The temperature sensor is attached to the exposed opposing ends of the conductor wires from the RFID tag. The temperature sensor of the instant invention includes an end piece attached to the temperature sensor that is composed of a potting material (such as a silicone or ceramic material) and a cap surrounding the end-piece and temperature sensor; the cap is laser welded to a stainless steel sheath of the mineral insulated cable to provide a sealed connection between the temperature sensor and the wires.

In one embodiment of the instant invention, the ends of the conductor wires are exposed (i.e. the mineral insulation and sheath are removed from the ends of the conductor wires, or the ends of the conductor wires are otherwise made devoid of insulation/sheath), and the conductor wires are sonic welded to the terminal pads of the RFID tag. In a preferred embodiment, the exposed portion of the conductor wires is contained within the epoxy-based material to provide a seal and moisture protection for the wire and RFID tag components.

In a preferred embodiment the mineral insulation is a highly compressed magnesium oxide.

In several embodiments of the instant invention, the RFID tag assembly (i.e. RFID tag, wires, and temperature sensor) is generally similar to the assemblies described in U.S. Pat. application Ser. No. 10/833,356, as it can use the same RFID tag and the same or similar temperature sensor, and the components all fit together in the same or similar manner and are located in generally the same or similar manner in the heatable object. The primary differences being inclusion of the tag molding, and the use of the mineral insulated cabling, and the temperature sensor end piece. The mineral insulated cabling of the instant invention has increased rigidity over the fiberglass insulated cables of the prior art, such that insertion of the temperature sensor into a tunnel bored into the base of a heatable object (such as is described in one embodiment of the invention in U.S. patent application Ser. No. 10/833,356) is made relatively easy as the rigidity of the cable itself allows the temperature sensor to be positioned into the tunnel. In addition, the general rigidity of the mineral insulated cable provided by the stainless steel sheath of the instant invention allows the temperature sensor to be inserted into the tunnel after a potting material has been injected into the tunnel, allowing the potting material to flow about and around the cable and the temperature sensor, and providing for more efficient and effective assembly. Notwithstanding, it will be appreciated that alternative embodiments of the instant invention may include any of the individual components described herein alone or in any combination with one another. In addition, it will be appreciated that the invention described herein is not limited to usage with the heatable objects described in U.S. Pat. application Ser. No. 10/833,356, but may be used in connection with any heatable objects now known or hereafter discovered.

In several embodiments of the invention, such as embodiments including imbedded or partially imbedded temperature sensors as described in U.S. patent application Ser. No. 10/833,356, a unique high temperature, thermally conductive potting material is used to fill any gaps or voids between the conductor wires (and/or the temperature sensor) and the surface of the heatable object in which the temperature sensor is located. The potting material of the instant invention comprises a high temperature, low or nonconductive material that is modified with a thermally conductive material to increase thermal conductivity. A preferred embodiment of the potting material comprises an extremely high temperature silicone based material that is modified with bauxite to increase thermal conductivity. The addition of bauxite to the moisture-resistant silicone-based potting material transforms the typically nonconductive (or poorly conductive) potting material which is designed to function primarily as a heat insulator, to a more highly conductive heat carrier. In one preferred embodiment, the silicone-based potting material is a two-part material that is cured with a cross-linker. The use of a cross-linker to cure the silicone-based potting material allows the material to cure in a confined space, such as in the tunnel described in U.S. patent application Ser. No. 10/833,356.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIGS. 2a and 2b are bottom and top views, respectively of an overmolding shell of the instant invention.

FIG. 3 is a perspective view of a pan tag assembly of the instant invention for use with the frying pan shown in FIG. 1.

DESCRIPTION OF PREFERRED EMBODIMENTS

Figure 1:
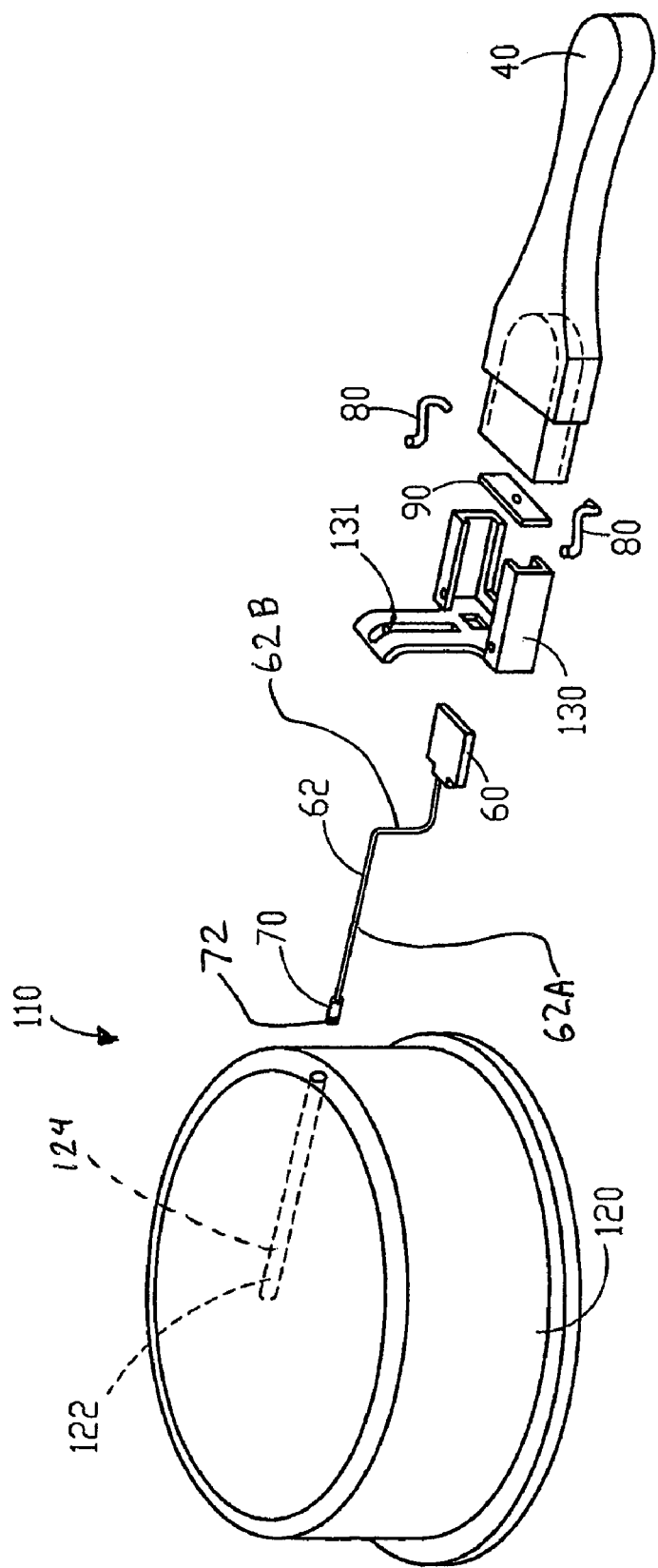
FIG. 1 is an exploded perspective view of a RFID controlled frying pan in which the inventive components are used.

As required, detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The instant invention is concerned with components for temperature regulated objects in which a temperature reading from the object is transmitted to a controller for a heat source. The controller for the heat source utilizes the temperature reading to control the amount of heat applied from the heat source on the object to control a cooking process.

Preferred embodiments of the instant invention are described herein in the form of components for temperature regulated cookware objects, such as pots and pans; it will however be appreciated that the instant invention relates to components for all temperature regulated objects including cookware objects as well as servingware objects. In preferred embodiments, components of the instant invention are intended to be used in connection with heatable objects similar to those disclosed in U.S. patent application Ser. No. 10/833,356, which can be heated by a Radio Frequency Identification (RFID) controlled induction heating appliance and through heating methods, similar to those discussed in U.S. Pat. No. 6,320,169 and U.S. Pat. application Ser. No. 10/355,989, the disclosures of which are all incorporated herein by reference. Nevertheless, it will be appreciated that components for temperature regulated objects intended to be heated by RFID controlled traditional cookware appliances (i.e. gas and electric stoves) are included within the scope of the instant invention. Furthermore, the scope of the instant invention includes components for temperature regulated objects utilizing non-RFID alternative means of transmitting object heating characteristic information and temperature reading information to a cookware appliance which are now known or hereafter discovered.

Referring to FIG. 1 an RFID controlled cookware object, in the form of a frying pan, is shown, which uses the components of the instant invention. FIG. 1 shows an exploded, bottom perspective view of a pan, 110, in which tunnel 122 extends to the center of the base of pan body 120. Pan 110 includes handle 40 connected to pan body 120 via bracket/receiver 130 including a depending portion 131, the depending portion following a contour of the pan 110. Spring clips 80 releasably secure handle 40 to receiver 130. RFID tag 60, is connected to temperature sensor assembly 70 via mineral insulated cable 62 having a cabling first portion 62A and a cabling second portion 62B. RFID tag 60 is encased in an overmolding (not shown in FIG. 1) and stored in a cavity located within handle 40. Gasket/insulator 90 is located between receiver 130 and handle 40.

The overmolding for RFID tag 60 includes overmolding shell 160 as is shown separately in FIGS. 2a and 2b and an epoxy-based material. Shell 160 includes base 162 and generally circumferential wall 164. Shell 160 is shaped slightly larger than tag 60 so that RFID tag 60 may be placed within wall 164 of shell 160 laying flat on base 162. RFID tag 60 includes two pads (not shown) on its surface, to which two conductors (not shown) of mineral insulated cable 62 are connected. Base 162 of shell 160 includes trough 168 to accommodate cable 62 in shell 160. The conductors of cable 62 are embedded within a highly compressed magnesium oxide covering and are covered with a stainless steel sheath in a manner similar to how conductors are embedded within fiberglass insulation in cables of the prior art. The stainless steel sheath houses or supports the magnesium oxide, which is a generally powdery substance, so that the conductors remain embedded within the magnesium oxide. The ends of the conductors are exposed (i.e. the magnesium oxide and stainless steel sheath are removed from the ends of the conductors, or the ends of the conductors are otherwise made devoid of any insulation), and the conductors are sonic welded to the terminal pads of RFID tag 60. A bead of epoxy material is applied to the conductors to provide an additional seal with the insulation (i.e. the magnesium oxide and the stainless steel sheath). The exposed portion of the conductors of cable 62 is ultimately maintained within the epoxy-based material which is surrounded by shell 160. A layer of the epoxy-based material is placed in shell 160 and RFID tag 60 is then placed in the shell such that cable 62 extends through opening 166 in wall 164. Then the epoxy-based material is placed over RFID tag 60 and allowed to harden and fully encase tag 60. This provides a tight seal to be formed around the insulated portion of cable 62 and shell 160 such that the RFID tag and the conductors will not be exposed to moisture during operation and/or cleaning of frying pan 110.

Shell 160 is made of a high temperature plastic material or alternatively can be made of any other suitable material that allows the desired amount of support and protection for RFID tag 60. In a preferred embodiment, shell 160 is made of a material that allows the epoxy based material that is poured into shell 160 to encase the RFID tag to bond with shell 160. It will be appreciated that the overcoating of the instant invention may be an epoxy or other suitable material (such as silicone) that is formed in a reusable mold, or which is otherwise made to encase RFID tag 60 without the use of shell 160. In such embodiments, the term "shell" refers to the material that encases the RFID tag, such as the epoxy.

It will be appreciated that the conductor wires of cable 62 of the instant invention can be manufactured of any conductive material commonly used for electrical wires, such as nickel metal copper, or any other suitable conducting material. In addition, it will be appreciated that although the mineral insulation of cable 62 is described herein as magnesium oxide, other suitable mineral insulating materials may be used without departing from the spirit and scope of the instant invention. In addition, it will be appreciated that other suitable non-mineral insulating materials may be used in connection with the stainless steel sheath of the instant invention. Furthermore, it will be appreciated that other suitable, generally rigid materials (such as plastic, high temperature plastic, glass, etc.) may be used instead of stainless steel for the sheath of cable 62 and for cap 72 (discussed below).

Temperature sensor assembly 70 includes a resistance temperature detector (RTD) that is attached to the conductors on the opposing end of cable 62 from RFID tag 60. It will be appreciated that alternative temperature sensors, such as thermistors, may be used instead of an RTD without departing from the spirit and scope of the instant invention. As is shown in FIG. 3, stainless steel cap 72 surrounds the RTD and is laser welded to the stainless steel sheathing of cable 62. A potting material (such as a silicone, a ceramic, or other suitable material) is located within cap 72 to surround the RTD. Cap 72 includes an outer diameter somewhat smaller than the inner diameter of tunnel 122 such that temperature sensor assembly 70 with cap 72 attached can be inserted into tunnel 122 for assembly.

In one embodiment, gasket/insulator 90 is a ceramic fabric that is embedded within a silicone material or other suitable waterproofing material. This structure provides a heat barrier between body 120 of pan 110 and RFID tag 60, and also provides a moisture barrier into handle 40. In another embodiment of the instant invention, RFID tag 60 is surrounded by a tubular blanket constructed of the same material as insulator 90. In a preferred embodiment, the tubular blanket is used in conjunction with the overmolding shell (160) to provide additional protection to RFID tag 60. Nevertheless, it will be appreciated that the tubular blanket may by itself function as the overmolding or "shell" of the instant invention.

In the embodiment shown in FIG. 1, temperature sensor assembly 70 is inserted into tunnel 122 of pan 110. In one embodiment, prior to insertion into tunnel 122, a high temperature, thermally conductive potting material 124 is injected into tunnel 122. Temperature sensor assembly 70 is then inserted into tunnel 122 and the potting material 124 is allowed to flow about and around sensor assembly 70 and cable 62. The potting material 124 is then allowed to cure. In a preferred embodiment, the potting material 124 comprises an extremely high temperature silicone based material that is modified with bauxite to increase thermal conductivity. Typically, silicone-based potting materials are used as insulators, and the silicone-based material is a poor heat conductor. The addition of a thermally conductive material, such as bauxite, to the water-resistant silicone-based material provides an improved interface between the RTD) of temperature sensor assembly 70 and the inner surface of tunnel 122, resulting in a more accurate temperature reading. It will be appreciated that the use of alternative thermally conductive materials (other than bauxite), and alternative moisture-resistant or moisture-proof non-conductive base materials (other than silicone-based materials), may be used without departing from the spirit and scope of the instant invention. For example, bauxite is a preferred conductive material for use in filling tunnel 122 in an aluminum core pan; in the case of a copper core pan it may be desirable to use copper as the conductive material. It will further be appreciated that that the term "potting material", as used herein shall include any material that can be used as a filler, including but not limited to adhesives, sealants, etc.

In one example the potting material was made by mixing together an extremely high temperature silicone-based potting material with bauxite. Approximately 38% bauxite was loaded to the silicone-based material and the two components were blended together. This provided suitable flowability for the material to be injected within tunnel 122 of pan 110 and resulted in a thermal conductivity equal to or greater than 9.6 BTU in/ft$^2$ F (approximately 1.38 W/m K). In addition, the potting material had an operating temperature range up to approximately 600 C, and able to operate continuously at 450 C. The potting material was a two part material that cures with the use of a cross linker. This allows the potting material to cure within tunnel 122 without being exposed to air or humidity or without requiring an additional step for curing.

The amount of bauxite (or other conductive material) loaded in the base material will depend upon the base material characteristics such as conductivity, operating temperature range and flowability, as well as the conductivity, operating temperature range and flowability desired for the final potting material. A conductivity level of 0.7 W/m K will provides minimal functionality; however it is preferred that a conductivity level of 1.38 W/m K or higher be obtained for optimum functionality.

The potting material of the instant invention can be injected in tunnel 122 in the manner described in U.S. patent application Ser. No. 10/833,356, or otherwise inserted into tunnel 122 in any other manner now known or hereafter discovered. In the preferred embodiment of the instant invention, the potting material is injected into tunnel 122 prior to insertion of temperature sensor assembly 70. The generally rigid sheath of cable 62 allows temperature sensor assembly 70 to be inserted through the potting material so that the material can about and around temperature sensor assembly 70 and cable 62 in tunnel 122.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A component for a heatable object comprising:
   a temperature sensor having an end cap of a material to increase thermal conductivity;
   a transmitter associated with said temperature sensor, said transmitter being operable to communicate temperature information obtained by said temperature sensor to a heating device; and
   a shell at least partially surrounding said transmitter and at least partially surrounding a portion of cabling connecting said temperature sensor to said transmitter when said transmitted is located within a handle or other cavity of the heatable object,
   wherein,
   the cabling (i) exits said transmitter in a direction parallel to a bottom surface of the heatable object, (ii) has a portion that runs in a direction perpendicular to the bottom surface of the heatable object, and (iii) has a portion that runs along the bottom surface of the heatable object such that the cabling substantially follows a contour of the heatable object.

2. The component as claimed in claim 1, wherein said shell includes a skirt depending from a base surface to surround an internal cavity within said shell.

3. The component as claimed in claim 2, wherein the skirt depends from the base surface to define a planar perimeter edge.

4. The component as claimed in claim 3, wherein the skirt protrudes from a first side of the base surface with an opening therein to expose a trough along said base surface.

5. A component for a radio frequency identification controlled object comprising:

a temperature sensor;

a radio frequency identification tag associated with said temperature sensor, said tag being operable to communicate temperature information obtained by said temperature sensor with a heating device; and a mineral insulated cabling comprising at least one conductor imbedded within a material insulation material having a generally low conductivity, said mineral insulating cabling connecting said tag to said temperature sensor, a thermally conductive potting material about said temperature sensor.

6. The component as claimed in claim 5 wherein said mineral insulated cabling comprises a conductor and a magnesium oxide covering surrounding said conductor.

7. The component as claimed in claim 6 further comprising a sheath surrounding said magnesium oxide covering.

8. The component as claimed in claim 7 wherein said sheath is stainless steel.

9. The component as claimed in claim 5 further comprising a cap surrounding said temperature sensor.

10. The component as claimed in claim 9 further comprising a potting material within said cap.

11. The component as claimed in claim 5, wherein the thermally conductive potting material is a combination of a silicon based material and bauxite.

12. A component for a heatable object comprising:

a temperature sensor;

a transmitter associated with said temperature sensor, said transmitter being operable to communicate temperature information obtained by said temperature sensor to a heating device; and a mineral insulated cabling comprising at least one conductor imbedded within a mineral insulation material having a generally low conductivity, said mineral insulated cabling connecting said transmitter to said temperature sensor, wherein, the cabling includes a cabling first portion and a cabling second portion, the cabling first portion is embeddable in a tunnel within the heatable object such that the cabling first portion runs in a direction parallel to a planar bottom surface of the heatable object;

the cabling first portion is connected to the temperature sensor, the cabling second portion is exposed from the tunnel to run at least partially in a direction perpendicular to the bottom surface of the heatable object;

the cabling second portion is concealable by a depending portion of a bracket, and the cabling second portion is connected to said tag.

13. A component for a heatable object comprising:

a temperature sensor;

a transmitter associated with said temperature sensor, said transmitter being operable to communicate temperature information obtained by said temperature sensor to a heating device;

a cabling connecting said tag to said temperature sensor;

a filler material for said cabling, the filler material being a modified nonconductive material; and a generally rigid sheath surrounding said cabling, wherein the cabling includes a cabling first portion and a cabling second portion, the cabling first portion is embeddable in a tunnel within the heatable object such that the cabling first portion runs in a direction parallel to a planar bottom surface of the heatable object;

the cabling first portion is connected to the temperature sensor, the cabling second portion is exposed from the tunnel to run at least partially in a direction perpendicular to the bottom surface of the heatable object;

the cabling second portion is concealable by a depending portion of a bracket, and the cabling second portion is connected to said tag.

14. The component as claimed in claim 13, wherein the depending portion of the bracket follows a contour of the heatable object.

15. The component as claimed in claim 13, wherein the cabling second portion follows a contour of the heatable object.

16. The component as claimed in claim 13, wherein the tunnel contains a thermally conductive potting material.

17. The component as claimed in claim 15, wherein the thermally conductive potting material is a combination of a silicon based material and bauxite.

18. The component as claimed in claim 15, wherein the cabling second portion also runs at least partially in a direction parallel to the bottom surface of the heatable object.

19. A component for a heatable object comprising:

a temperature sensor having an end cap of a material to increase thermal conductivity;

a transmitter associated with said temperature sensor, said transmitter being operable to communicate temperature information obtained by said temperature sensor to a heating device; and a shell at least partially surrounding said transmitter and at least partially surrounding a portion of cabling connecting said temperature sensor to said transmitter when said transmitted is located within a handle or other cavity of the heatable object, wherein, said shell includes a skirt depending from a base surface to surround an internal cavity within said shell, the skirt depends from the base surface to define a planar perimeter edge, the skirt protrudes from a first side of the base surface with an opening therein to expose a trough along said base surface, and either side of said trough begins on either side of the opening and extends along said base surface in a convergent direction toward a point located at a second side of the base surface.

20. A component for a heatable object comprising:

a temperature sensor having an end cap of a material to increase thermal conductivity;

a transmitter associated with said temperature sensor, said transmitter being operable to communicate temperature information obtained by said temperature sensor to a heating device; and a shell at least partially surrounding said transmitter and at least partially surrounding a portion of cabling connecting said temperature sensor to said transmitter when said transmitted is located within a handle or other cavity of the heatable object, wherein,
 said shell includes a skirt depending from a base surface to surround an internal cavity within said shell,
 the skirt depends from the base surface to define a planar perimeter edge,
 the skirt protrudes from a first side of the base surface with an opening therein to expose a trough along said base surface, and
 the trough decreases in depth from the first side of the base surface to a second side of the base surface relative to the planar perimeter edge.

* * * * *